United States Patent [19]
Vaillier et al.

[11] Patent Number: 5,666,758
[45] Date of Patent: Sep. 16, 1997

[54] RETRIEVAL MECHANISM

[76] Inventors: George Louis Vaillier, deceased, late of North Bend, Wash.; by Francine Seung, heiress, 12704 SE. 398th, North Bend, Wash. 98045

[21] Appl. No.: 480,402

[22] Filed: Jun. 7, 1995

[51] Int. Cl.⁶ ............................................. A01K 97/24
[52] U.S. Cl. ...................... 43/17.2; 294/110.1; 294/118
[58] Field of Search ..................... 43/17.2; 294/66.1, 294/110.1, 118

[56] References Cited

U.S. PATENT DOCUMENTS

| | | | |
|---|---|---|---|
| 290,482 | 12/1883 | Scanlan | 294/66.1 |
| 384,107 | 6/1888 | Wiley | 294/110.1 |
| 1,135,338 | 4/1915 | Vécsey | 294/66.1 |
| 1,616,410 | 2/1927 | Buell . | |
| 1,815,370 | 3/1931 | Munger | 43/17.2 |
| 2,083,814 | 6/1937 | Bence | 43/17.2 |
| 2,176,921 | 10/1939 | Neff | 294/118 |
| 2,355,086 | 8/1944 | Lang . | |
| 2,553,235 | 5/1951 | Brace . | |
| 2,770,062 | 11/1956 | Russell | 43/17.2 |
| 3,010,241 | 11/1961 | Terry | 43/77.2 |
| 3,360,292 | 12/1967 | Trammell . | |
| 3,697,118 | 10/1972 | Johnstone et al. | 294/110.1 |
| 3,805,435 | 4/1974 | Serrill | 43/17.2 |
| 3,837,699 | 9/1974 | Anderson et al. | 294/118 |
| 3,861,071 | 1/1975 | Nordhagen | 43/17.2 |
| 4,152,859 | 5/1979 | Hansen . | |
| 4,223,465 | 9/1980 | Nichols . | |
| 4,467,547 | 8/1984 | Chabot . | |
| 4,598,493 | 7/1986 | O'Brien et al. | 43/17.2 |
| 4,943,099 | 7/1990 | Gabriel | 294/110.1 |
| 5,364,147 | 11/1994 | Dickey et al. | 294/118 |

*Primary Examiner*—Joseph J. Hail, III
*Assistant Examiner*—Darren Ark
*Attorney, Agent, or Firm*—Zackery Legal Group

[57] ABSTRACT

A device (10) remotely retrieves articles (12). The device includes a scissor mechanism(14) having a pair of cross members (22) rotatably connected to one another. The cross members define a first pair of ends and a second pair of ends opposite the first pair of ends. The first ends are urged to a position spaced apart from one another when the second ends are urged to a position spaced apart from one another. Conversely, the first ends are urged to a position proximate one another when the second ends are urged to a position proximate one another. Opposing jaws (16) connect to the first ends. A connection mechanism (14) connects the second ends of the scissor mechanism to one another. The connection mechanism is foldable for urging the second ends to a position proximate one another when tension is applied to the connection mechanism. A latch mechanism (20) connects to the scissor mechanism and removably connects to the connection mechanism for preventing the connection mechanism from folding.

14 Claims, 2 Drawing Sheets

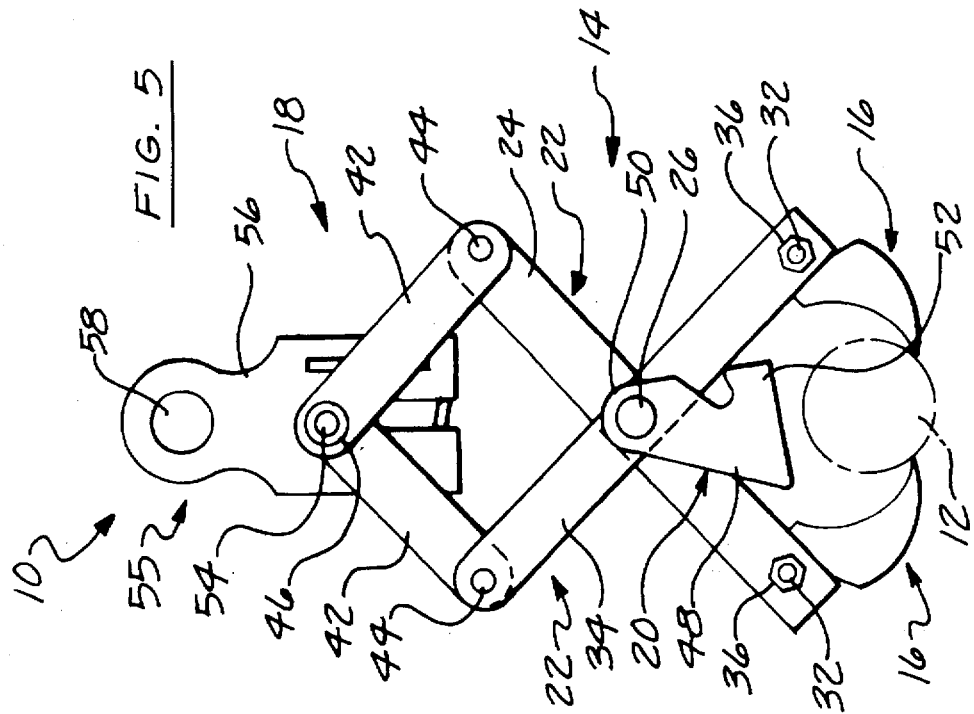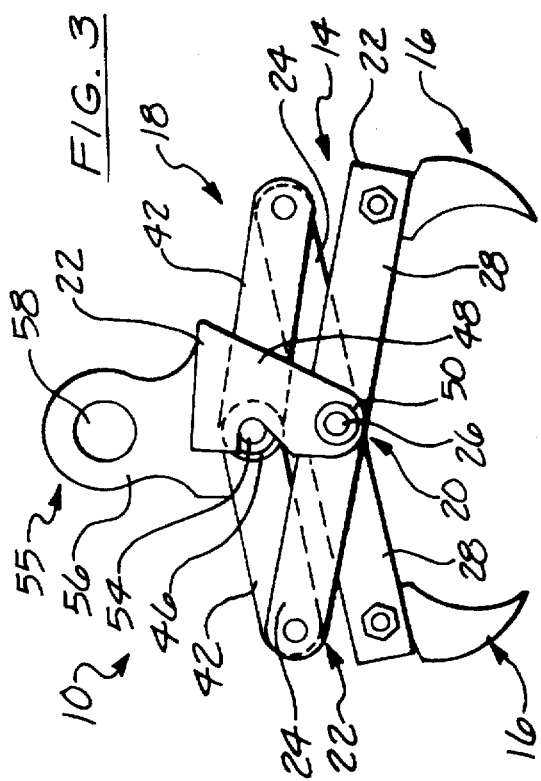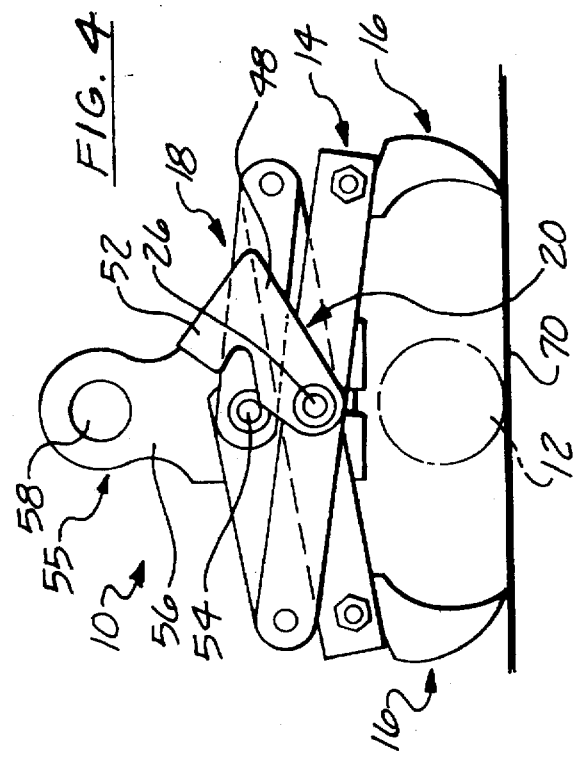

RETRIEVAL MECHANISM

FIELD OF THE INVENTION

The present invention relates generally to retrieval devices, and in particular, to retrieval devices used to remotely connect to an article to be retrieved.

BACKGROUND OF THE INVENTION

Frequently, persons desire to retrieve an article from a location that inhibits direct access to the article, such as an article submerged in a body of water or other fluid. Often, to retrieve such an article, persons attempt to remotely capture the article by using hooks disposed on the ends of poles or lines. Once the article has been captured, persons pull on the pole or line to draw the article to a location where it can be directly accessed.

However, many articles cannot readily be retrieved using a hook. For example, some articles have smooth exteriors that are not easily engaged by a hook. Other articles may be readily capturable by a hook, but the article does not have sufficient structural integrity to withstand retrieval by pulling on the hook. That is, retrieving the article with a hook damages the article.

Moreover, while an article may be capturable by using a hook, often it is difficult to position the hook to capture the article. This is especially true when the article cannot be observed while attempts are made to capture it, such as when the article is submerged in deep water.

Consequently, there have been attempts to fashion retrieval devices that solve some of the foregoing problems. For example, U.S. Pat. No. 4,223,465 discloses a device for retrieving fishing lures that have become snagged in weeds. The device includes a pair of opposed hooks, and is lowered along a fishing line connected to the lure using a separate retrieval line. When the device reaches the lure, it is repeatedly pulled to rip up the weeds snagging the lure so that the lure can be retrieved. The problem with this attempted solution is that it is generally limited in use to situations where a fishing lure has been snagged in weeds that can be ripped up, and the fishing line remains connected to the lure.

U.S. Pat. No. 4,467,547 discloses a device in the form of a ring having a plurality of barbs for retrieving fishing lures. The ring is placed around a fishing line connected to the lure, and lowered onto the lure using a separate retrieval line. Once the ring contacts the lure, the barbs capture the lure or the object snagging the lure, and the retrieval line is pulled to retrieve the lure, and possibly the object snagging the lure. This attempted solution also suffers from the problem of limited applicability. Namely, the device is generally limited in use to retrieving fishing lures, in which a fishing line connected to the lure is still accessible.

Other attempted solutions have been directed to arrangements including opposed jaws for grasping the article to be retrieved. However, these device have tended to be overly complex, relying upon either a plurality of cables, a biasing mechanism, or both for causing the jaws to close around the article.

For example, U.S. Pat. No. 4,152,859 discloses a retrieval device having jaws with spring loaded hinges, and a plurality of cables. U.S. Pat. No. 2,355,086 teaches a retrieval device having jaws operated by an electric motor, a first cable for supplying power to the motor, and a second cable for pulling and lifting the device after the jaws have closed against the article to be retrieved. U.S. Pat. Nos. 1,616,410 and 3,360,292 both disclose retrieval devices that require a plurality of cables for use, while U.S. Pat. No. 2,553,235 discloses a spring gaff disposed on the end of a pole.

The present invention provides an improved solution.

SUMMARY OF THE INVENTION

The present invention provides a device for remotely retrieving articles. The device includes a scissor mechanism having a pair of cross members rotatably connected to one another. The cross members define a first pair of ends and a second pair of ends opposite the first pair of ends. The first ends are urged to a position spaced apart from one another when the second ends are urged to a position spaced apart from one another. Conversely, the first ends are urged to a position proximate one another when the second ends are urged to a position proximate one another. A first jaw connects to one of the first ends, and a second jaw opposing the first jaw connects to the other one of the first ends.

A connection mechanism connects the second ends of the scissor mechanism to one another. The connection mechanism is foldable for urging the second ends to a position proximate one another when tension is applied to the connection mechanism. More particularly, the connection mechanism is foldable to a configuration having a narrowed width for urging the second ends to a location proximate one another. The connection mechanism unfolds from the folded configuration to an expanded width for urging the second ends to a position removed from one another.

A latch mechanism connects to the scissor mechanism and removably connects to the connection mechanism. The latch mechanism prevents the connection mechanism from folding to the configuration having the narrowed width when the latch mechanism is connected to the connection mechanism. Specifically, the latch mechanism retains the connection mechanism in the configuration having an expanded width when the latch mechanism is connected to the connection mechanism. Preferably, the latch mechanism remains connected to the scissor mechanism so long as a continuous tension force is applied to the latch mechanism. However, when the tension force is interrupted, the latch mechanism is urged to disconnect from the scissor mechanism.

The latch mechanism preferably includes a hook having a base and a hooking end opposite the base. The base rotatably connects to the scissor mechanism, and the hooking end removably connects to the connection mechanism. In the preferred embodiment, the latch mechanism includes a pin projection projecting from the connection means, which the hooking end removably connects to.

Preferably, the connection means includes first and second connection members, wherein each connection member has first and second ends. The first end of one of the connection members rotatably connects to one of the first ends of the scissor mechanism, and the first end of the other connection member rotatably connects to the other first end of the scissor mechanism. The second ends of the connection members rotatably connect to one another.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates a rear view of the device of FIG. 1 in the cocked position;

FIG. 4 illustrates a rear view of the device of FIG. 1 being "triggered" to grasp an article; and FIG. 5 illustrates a rear view of the device of FIG. 1 grasping an article.

DETAILED DESCRIPTION OF THE PREFERRED EMBODIMENT

Figure 2:
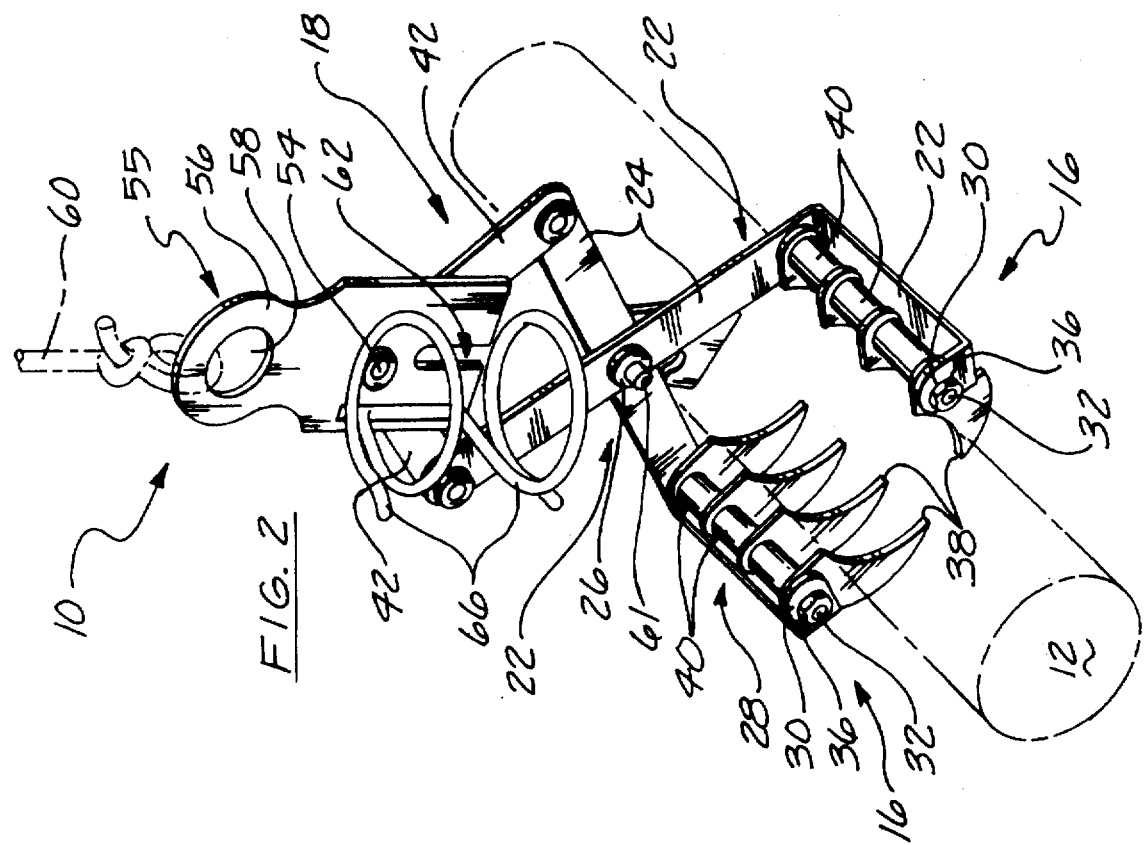
FIG. 2 illustrates a frontal, perspective view of the device of FIG. 1 grasping an article.

The figures illustrate a first preferred embodiment of a device 10 in accordance with the present invention for remotely retrieving articles, such as article 12 shown in phantom in FIGS. 2, 4 and 5. Referring specifically to FIG. 5, the device 10 includes a scissor mechanism 14 having a pair of opposed jaws 16 connected to the lower end of the scissor mechanism for grasping the article 12. A foldable or collapsible connection mechanism 18 connects to the opposite end of the scissor mechanism 14. When the connection mechanism 18 folds or collapses about a line passing longitudinally through the device between the jaws 16, it causes the scissor mechanism 14 to urge the jaws towards one another against the article. Conversely, when the connection mechanism 18 unfolds or expands away from the same line, it causes the scissor mechanism 14 to urge the jaws 16 away from one another.

A retainer or latch mechanism 20 connects to the scissor mechanism 14 and removably connects to the connection mechanism 18. When the latch mechanism 20 connects to the connection mechanism 18, the connection mechanism is prevented from collapsing, and thus retains the jaws 16 in a position removed from one another as shown in FIG. 3. When the latch mechanism 20 disconnects from the connection mechanism 18, the jaws 16 may move towards one another as shown in FIG. 5.

The scissor mechanism 14 includes a pair of cross members 22 pivotably connected to one another. As shown in FIG. 2, elongated flat plates form the cross members 22, which are bent to form a shape corresponding generally to an upper case letter "L." A pin 26 rotatably connects the upper legs 24 of the L-shaped cross members to one another. The pin 26 passes substantially orthogonally through the approximate midpoint of each upper leg 24.

The lower legs 28 of the cross members 22 extend from the upper legs in a direction substantially parallel to the axis the cross members rotate about. The tips 30 of the lower legs 28 are rounded, and bend substantially orthogonally upward to define a shallow channel between each upper leg 24, and the tip 30 of each lower leg.

The jaws 16 mount to the lower legs 28 of the cross members 22. Each jaw 16 includes a rod 32 mounted in the above-described shallow channel with the rod lying substantially parallel to and spaced away from the length of the lower leg 28 defining the channel. One end of the rod 32 extends through the tip 30 defining one wall of the channel, and the other end of the rod extends substantially orthogonally through the upper leg 24 defining the opposite wall of the channel. The ends of the rod 32 are threaded and secured in place with nuts 36.

A plurality of pointed, curved teeth 38 project substantially orthogonally from the rod 32 at regular, spaced intervals. More particularly, the rod 32 passes substantially orthogonally through the blunt, proximal ends of the teeth 38, which curve convexly downward from the rod towards the opposite jaw 16. Sleeves 40 coaxially surround the rod 32 between adjacent teeth 38 for maintaining the spacing and orientation of the teeth relative to the device 10.

With reference to FIG. 5, the connection mechanism 18 includes a pair of connection members 42. One end of one of the connection members 42 rotatably connects to the distal end of the upper leg 24 of one cross member 24 of the scissor mechanism 14. Similarly, one end of the other connection member 42 rotatably connects to the distal end of the upper leg 24 of the other cross member 24. Pins 44 pass substantially orthogonally through the connection and cross members 42 and 22 to form an axle the members rotate about. The axis of rotation lies substantially parallel to the lower legs 28 of the cross members 22 (see FIG. 2).

A pin 46 rotatably connects the opposite ends of the connection members 42 to one another. The pin 46 passes substantially orthogonally through the connection members 42 to form an axle for rotation of the connection members relative to one another. The axis of rotation lies substantially parallel to the axis of rotation of the connection members 22.

The retainer or latch mechanism 20 includes a hook 48 having a base 50 and a hooking head 52 opposite the base. The base 50 rotatably connects to the rear side of the scissor mechanism 14, which is the side facing away from the lower legs 28 of the cross members 22. The pin 26 rotatably connecting the cross members 22 of the scissor mechanism 14 to one another, also rotatably connects the base 50 of the hook 48 to the scissor mechanism.

Additionally, the latch mechanism 20 includes a cylindrical projection 54 that extends rearwardly and coaxially from the pin 46 rotatably connecting the connecting members 42 together. The hooking head 52 of the hook 48 rotates to removably hook or capture the cylindrical segment 54 in a notch in the hooking head as shown in FIG. 3. When the hooking head 52 hooks the cylindrical projection 54, the ends of the connection members 42 connected to the scissor mechanism 14 are positioned away from one another. Further, the distal ends of the upper legs 24 of the cross-members 22 are positioned away from one another, which causes the lower legs 28 and the jaws 16 to be positioned away from another.

Referring to FIG. 5, when the hook 48 does not engage the cylindrical projection 54, the connection mechanism 18 can fold or collapse about a line passing downwardly between the jaws 16. Specifically, the ends of the connection members 42 connected to the scissor mechanism 14 move towards one another when the connection member folds or collapses about a line passing downwardly between the jaws 16. This folding of the connection mechanism 18 causes the distal ends of the upper legs 28 of the scissor cross members 22 to move towards one another, which causes the jaws 16 to move towards one another.

Preferably, the center of gravity of the hook 48 lies at a location closer to the hooking head 52 end of the hook than the base 50 end of the hook. Additionally, preferably the center of gravity of the hook 48 lies closer to the side of the hook opposite the notch in the hooking head 52, than the other side of the hook. In the preferred embodiment this is accomplished by making the hooking head 52 larger than the base 50, and enlarging the side of the hooking head opposite the notch of the hooking head. This significantly biases the hook 48 to fall downwardly away from the cylindrical projection 54 due to gravity, unless a tension force pulls the hooking head 52 against the cylindrical projection. As described in more detail below, the weight of the scissor mechanism 14 and jaws 16 is sufficient to supply a tension force to retain the hooking head 52 hooked over the cylindrical projection 54.

Figure 1:
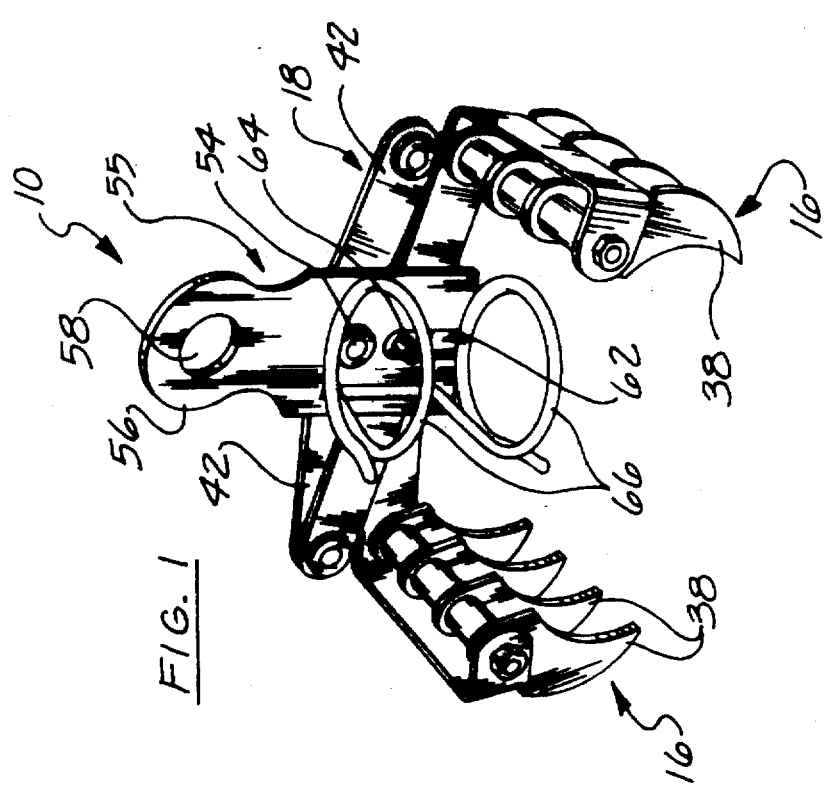
FIG. 1 illustrates a frontal, perspective view of a preferred embodiment of a retrieval device in accordance with the present invention in the "cocked" position.

The device 10 also includes a guidance mechanism 55 as best seen in FIGS. 1 and 2. The guidance mechanism 55 includes a plate 56 rotatably mounted approximately through its central axis to the connection mechanism 18 on the front side of the device 10. More particularly, the pin 46 rotatably connecting the connection members 42 together also rotatably connects the plate 56 to the connection mechanism 18. An aperture 58 is formed through one end of the plate 56 for connection to a retrieval line 60, which is shown in phantom in FIG. 2. The retrieval line 60 may be used to lower the device 10 onto an article to be retrieved, and thereafter used to lift the device 10 after the article has been grasped between the jaws 16 of the device.

The end of the plate 56 opposite the aperture 58 includes a slot 62 extending approximately along the longitudinal axis of the plate. The slot 62 is for receiving a cylindrical projection 64. The cylindrical projection 64 extends forwardly and coaxially from the pin 26, which rotatably connects the cross members 24 of the scissor mechanism 14 to one another. When the connection mechanism 18 folds as shown in FIG. 1, the slot 62 slidably receives the cylindrical projection 64 to orient the longitudinal axis of the plate 56 along a line extending generally downward, centrally between the jaws 16 for maintaining the plate in this orientation. When the connection mechanism unfolds or uncollapses so that the jaws 16 moves toward one another as shown in FIG. 2, the cylindrical projection 64 passes from the slot 62 so that the plate 56 can rotate.

Loops 66 project substantially orthogonally from the front surface of the plate 56. In the preferred embodiment, the loops 66 are made from a wire bent to form the loops, with a section of the wire between the loops being connected to the plate 56. One loop 66 is spaced apart from the other, with the central axes of the loops coaxially aligned with one another and generally parallel to the longitudinal axis of the plate 56. The loops 66 are for guiding the device 10 to the article 12 to be retrieved. For example, the article 12 could be a fishing lure snagged on debris on the bottom of a lake or other body of water. If fishing line connected to the article 12 is accessible, the fishing line may be threaded through the loops 66 to guide the device 10 to the article 12.

The device 10 is used to retrieve an article 12 as follows. Prior to retrieving the article 12, the device 10 is "cocked." Specifically, the connection mechanism 18 is folded or collapsed as shown in FIGS. 1 and 3 so that the jaws 16 are at their maximum distance from one another. Additionally, the latch mechanism 20 is removably connected to the connection mechanism 18 to retain the device 10 in this configuration. In particular, the hooking head 52 of the hook 48 is rotated upwardly to capture the cylindrical projection 54 extending from the connection mechanism 18. Further, the device 10 is suspended by a retrieval line (see FIG. 2) connected to the guidance mechanism 55. Thus, the weight of the scissor mechanism 18 and the jaws 16 apply tension to the hook 48 so that the hooking head 52 is retained on the cylindrical projection 54.

Thereafter, the device 10 is lowered towards the article 12 as shown in FIG. 4 so that the article 12, or a portion of the article, lies between the jaws 16. When the lower surface of the scissor mechanism 14 or the jaws 16 impact another surface, such as the surface 70 supporting the article 12, the surface supports the weight of the scissor mechanism and/or the jaws 16. This interrupts or relieves the tension in the hook 48, so that the hooking head 54 falls away from the pin 54 of the connection mechanism 18, thus "triggering" the device 10.

Subsequently, the device 10 is pulled away from the article 12 using the retrieval line 60 as shown in FIGS. 2 and 5. This applies a tension force to the connection mechanism 18 causing the connection mechanism to unfold, and urging the jaws 16 towards another. Hence, the jaws 16 are urged against opposite sides of the article 12 for capturing the article.

Thus, the device 10 can be used to remotely retrieve articles that are otherwise inaccessible, such as articles submerged under pools of liquid, in mountain crevasses, canyons, or other areas where articles are difficult to directly access. Preferably the device 10 is formed of a metal alloy for maximum strength, and of an alloy having corrosion resistance to liquids.

While the preferred embodiment of the invention has been illustrated and described, it will be appreciated that various changes can be made therein without departing from the spirit and scope of the invention. For example, the connection mechanism 18 could have flexible connection members formed of cable, chain, or other flexible material that do not necessarily rotatably connect to one another or to the scissor mechanism. Flexible connection members would permit the connection mechanism 18 to fold or collapse without requiring rotatable connections.

Additionally, the latch mechanism 20 could be replaced with a catch or loop that rotates about an axis generally perpendicular to the longitudinal axis of the pin 26. Moreover, the hook 48 of the latch mechanism 20 could be biased to unhook from the connection mechanism 18 in the absence of a tension force by using a spring for the biasing force, rather than relying upon gravity. Further, the guidance mechanism 55 is not essential for operating the device, and could be eliminated. In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A device for retrieving articles, comprising:
   (a) a first cross member having first and second ends;
   (b) a second cross member having first and second ends, the second cross member being connected to the first cross member at a location between the first and second ends of both cross members, with the cross members being rotatable relative to one another along an axis of rotation;
   (c) a first jaw located at the first end of the first cross member, and a second jaw opposing the first jaw, the second jaw being connected to the first end of the second cross member, wherein said first jaw and said second jaw each include a supporting member cantilevered outward from the first ends of said first cross member and said second cross member respectively, the supporting members each having a plurality of teeth mounted thereto;
   (d) connection means connected to the second ends of each of the first and second cross members, the connection means being collapsible from a first width to a second width smaller than the first width when a tension force is applied to the connection means; and
   (e) a guidance member rotatably connected to the connection means, the guidance member including a loop for receiving a line, wherein the loop extends from the guidance member in a direction that is always generally parallel to the axis of rotation between the pair of cross members.

2. The device of claim 1, wherein the connection means includes:

(a) a first connection member having first and second ends, the first end of the first connection member being rotatably connected to the second end of the first cross member; and (b) a second connection member having first and second ends, the first end of the second connection member being rotatably connected to the second end of the second cross member, and the second ends of both connection members being rotatably connected to one another.

3. The device of claim 1, further comprising latch means connected to one of the cross members and being removably connectable to the connection means, the latch means preventing the connection means from collapsing when the latch means is connected to the connection means, wherein the latch means includes a hook having a base and a hooking end opposite the base, the base being connected to one of the cross members, and the hooking end being removably connectable to the connection means.

4. The device of claim 1, wherein the first and second cross members are rotatably connected to one another with a pin, and the latch means connects to the pin.

5. The device of claim 1, wherein the teeth mount to a supporting member at spaced distances from one another along the length of the supporting member.

6. The device of claim 1, wherein the guidance member further includes a second loop, the second loop extending from the guidance member and having a central axis generally aligned with the central axis of the other loop.

7. A device for retrieving articles, comprising:

(a) a scissor mechanism including a pair of cross members connected to one another and being rotatable relative to one another about an axis rotation, the cross members defining a first pair of ends and a second pair of ends opposite the first pair of ends, the ends of the first pair of ends being urged to a position spaced apart from one another when the ends of the second pair of ends are urged to a position spaced apart from one another, and the ends of the first pair of ends being urged to a position proximate one another when the ends of the second pair of ends are urged to a position proximate one another;

(b) a first jaw connected to one of the ends of the first pair of ends, and a second jaw opposing the first jaw connected to the other one of the ends of the first pair of ends, wherein the jaws each include a cantilevered supporting member having a plurality of teeth; and (c) connection means connecting the ends of the second pair of ends to one another, the connection means being foldable to urge the ends of the second pair to a position proximate one another when tension is applied to the connection means.

8. The device of claim 7, further comprising latch means connected to the scissor mechanism and removably connected to the connection means, the latch means preventing the connection means from folding when the latch means is connected to the connection means, wherein the connection means is foldable to a configuration having an expanded width for urging the ends of the second pair of ends to positions removed from one another, and foldable to a configuration having a narrowed width for urging the ends of the second pair of ends to locations proximate one another, and wherein the latch means retains the connection means in the configuration having an expanded width when the latch means is connected to the scissor mechanism.

9. The device of claim 8, wherein the latch means includes a hook having a base and hooking end opposite the base, the base being rotatably connected to the scissor mechanism, and the hooking end being removably connectable to the connection means.

10. The device of claim 9, wherein the connection mechanism includes first and second connection members each having first and second ends, the first end of one of the connection members being rotatably connected to one of the first pair of ends of the scissor mechanism, the first end of the other connection member being rotatably connected to the other end of the first pair of ends, the connection mechanism including a pin rotatably connecting the second ends of the connection members to one another, with the pin projecting outward from the connection mechanism that the hooking end of the latch mechanism removably connects to.

11. The device of claim 7, wherein the connection means includes:

(a) a first connection member having first and second ends, the first end of the first connection member being rotatably connected to one of the ends of the second pair of ends of the scissor mechanism; and (b) a second connection member having first and second ends, the first end of the second connection member being rotatably connected to the other end of the second pair of ends, and the second ends of both connection members being rotatably connected to one another.

12. The device of claim 7, further comprising a guidance mechanism rotatably connected to the connection means, the guidance mechanism including a plurality of loops.

13. The device of claim 12, further comprising:

(a) a pin projecting from the scissor mechanism and substantially aligned with the axis of rotation between the cross members; and (b) a slot defined in the guidance mechanism, the slot in the guidance mechanism receiving the pin when the connection means is in an unfolded configuration, for preventing the guidance mechanism from rotating.

14. The device of claim 12, wherein the guidance mechanism includes at least two loops having central axes that are generally aligned with one another.

* * * * *